Figure 6:
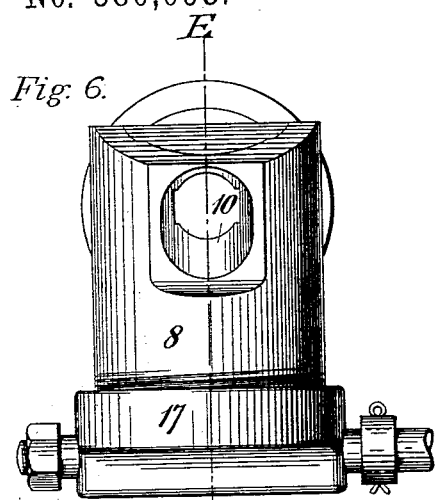

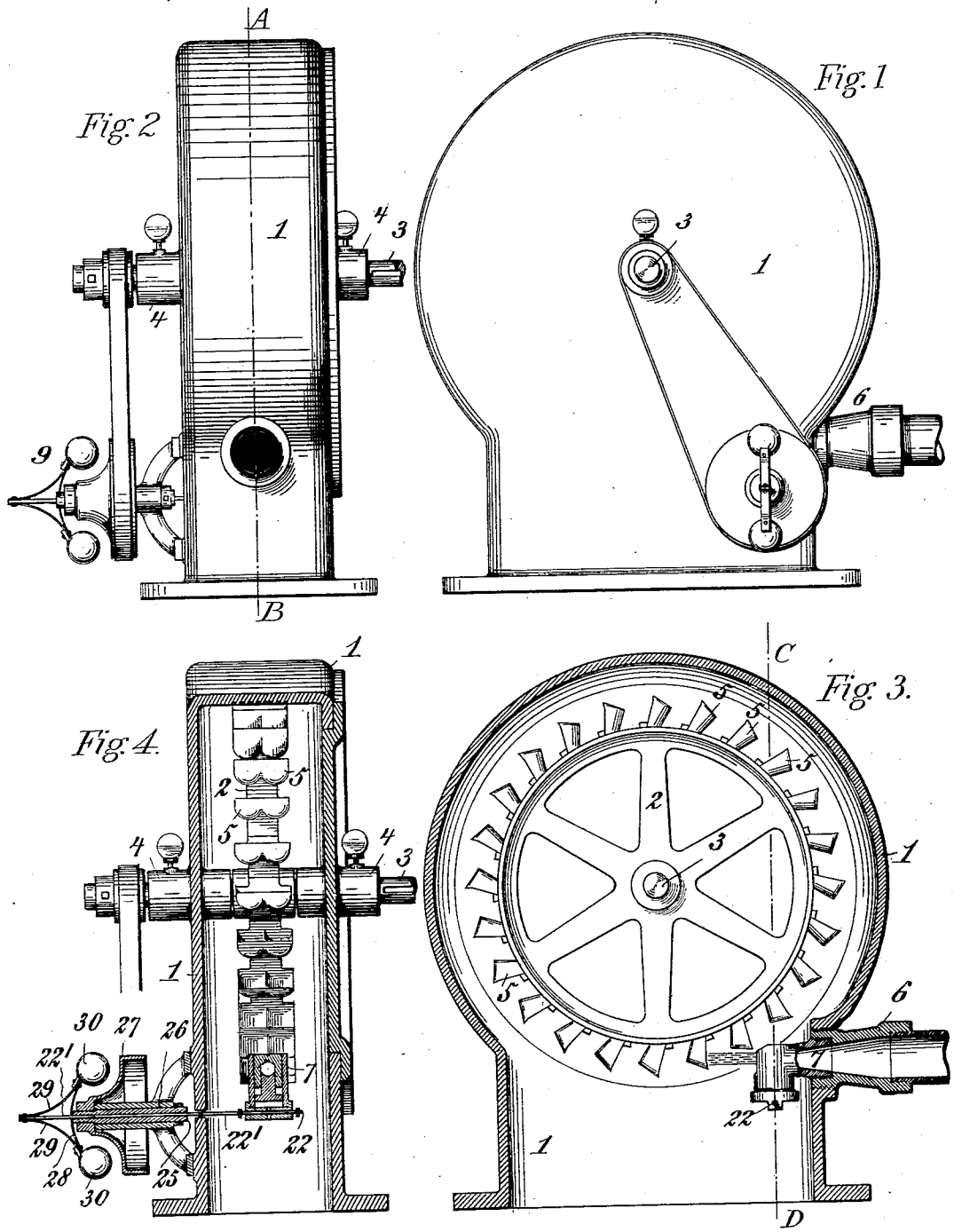

(No Model.) 2 Sheets—Sheet 2.

H. D. WILLIAMS.
GOVERNOR FOR WATER MOTORS.

No. 580,098. Patented Apr. 6, 1897.

Witnesses.
Wm. Strunk, jr.
O. F. Emerson

Inventor.
Harvey D. Williams
per E. M. Marble & Sons
Attorneys

UNITED STATES PATENT OFFICE.

HARVEY D. WILLIAMS, OF ITHACA, NEW YORK.

GOVERNOR FOR WATER-MOTORS.

SPECIFICATION forming part of Letters Patent No. 580,098, dated April 6, 1897.

Application filed March 13, 1896. Serial No. 583,124. (No model.)

*To all whom it may concern:*

Be it known that I, HARVEY D. WILLIAMS, a citizen of the United States, residing at Ithaca, in the county of Tompkins and State of New York, have invented certain new and useful Improvements in Governors for Water-Motors; and I do hereby declare the following to be a full, clear, and exact description of the invention, such as will enable others skilled in the art to which it appertains to make and use the same.

My invention relates to governors for water wheels or motors employed for regulating the speed of the wheel and maintaining constant speed thereof under varying conditions of load or water-pressure; and my invention is particularly applicable to water wheels or motors of the Pelton class, although it may be applied to turbine wheels as well. The governor comprises a gate or regulating valve controlling the flow of water to the wheel, the opening and closing of the valve being effected by a fly-ball governor driven from the main shaft of the motor, the valve being so constructed, however, that the speed of opening or closing may be adjusted, so that overgoverning or undergoverning may both be prevented.

My invention consists in the novel gate or regulating valve used, in the novel means provided for operating the same, in the novel means provided for regulating the rate of opening and closing of the same, in the novel means provided whereby the valve may be operated by a comparatively small, light, and sensitive fly-ball governor, and in the novel combination, construction, and arrangement of the parts.

The objects of my invention are, first, to provide a governor for water wheels and motors which shall be more rapid in its operation and shall more perfectly control the speed of the wheel than governors heretofore used; second, to provide a governor in which the rate of opening or closing of the regulating-valve may be regulated, so that overgoverning or undergoverning may be prevented; third, to provide a governor which may be adjusted to maintain different speeds of the water wheel or motor; fourth, to provide a regulating-valve which may be operated by a comparatively small and light and very delicate fly-ball governor and in which the rate of opening or closing of the valve may be regulated independently of the fly-ball governor, and, fifth, to make the governor simple, compact, durable, requiring but little power for its operation, easily regulated and adjusted, and as inexpensive as possible. These objects are attained in the governor herein described and illustrated in the drawings which accompany and form a part of this application, in which the same reference-numerals indicate the same or corresponding parts, and in which—

Figure 5:
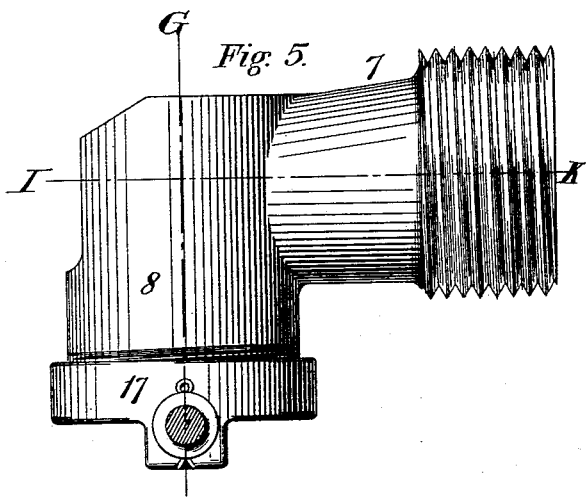
Figure 8:
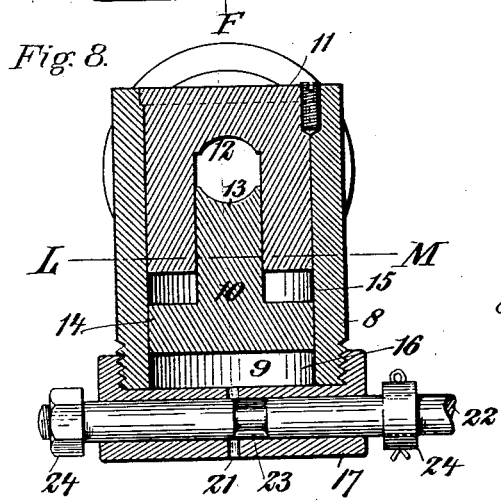
Figure 7:
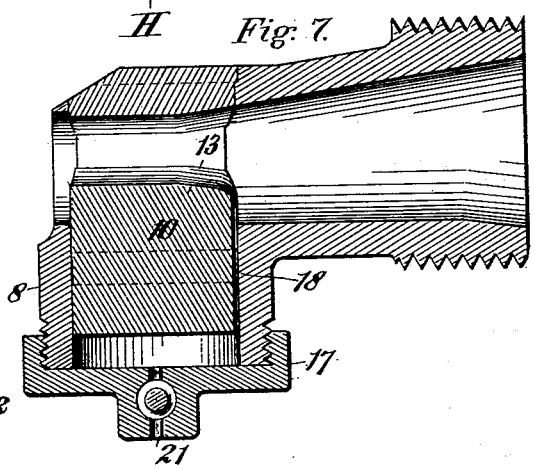
Figure 10:
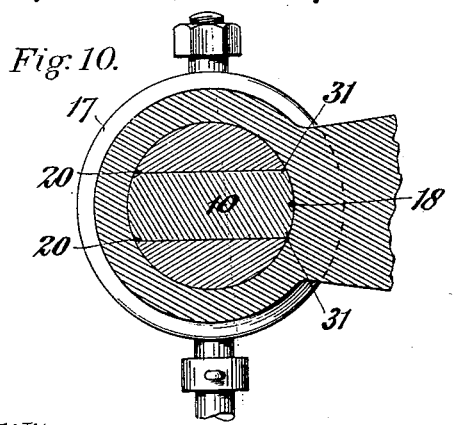
Figure 9:
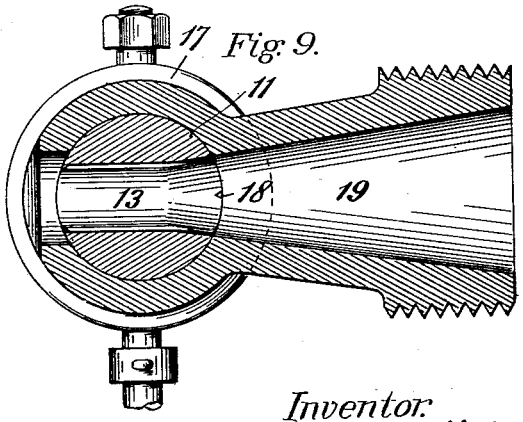

Figure 1 is a side elevation of a water-wheel of the Pelton type inclosed within the usual protecting-case. Fig. 2 is an end elevation of the same wheel. Fig. 3 is a central vertical section on the line A B of Fig. 2, showing the buckets and bucket-wheel and the nozzle through which the water is projected into the buckets. Fig. 4 is a transverse vertical section of the wheel upon the line C D of Fig. 3, which passes through the center of the regulating-valve of the nozzle. Fig. 5 is a side elevation of the nozzle and regulating-valve. Fig. 6 is an end elevation thereof. Fig. 7 is a central vertical section of the nozzle and regulating-valve upon the line E F of Fig 6. Fig. 8 is a transverse vertical section of the nozzle and regulating-valve upon the line G H of Fig. 5, which passes through the center of the regulating-valve, as does the line C D of Fig. 3. Fig. 9 is a horizontal section of the nozzle and regulating-valve upon the line I K, which passes through the center of the bore of the nozzle; and Fig. 10 is a horizontal section of the regulating-valve upon the line L M of Fig. 8.

In the drawings, 1 is the case surrounding and inclosing the bucket-wheel.

2 is the bucket-wheel, mounted upon a driving-shaft 3, which rotates in bearings 4 4 of the case 1.

5 5 are cup-shaped buckets of the type usually used in Pelton water-wheels, mounted upon the periphery of the bucket-wheel.

6 is the supply-pipe through which the water is supplied to the water-wheel and which screws into the casing 1. In its inner end screws a nozzle 7, having a tapering bore, and which is provided, as is shown particularly in Figs. 5 to 9, inclusive, with a regulating-valve, by which the size of the jet of water issuing from the nozzle may be regulated. The jet of water from the nozzle 7 impinges upon the buckets 5 successively, imparting the energy due to its velocity to the bucket-wheel 2, and thus causing said wheel to revolve. When its velocity has thus been imparted, the water falls from the buckets into a discharge-passage in the bottom of the case 1.

The regulating-valve contained within the nozzle 7 is operated by a fly-ball governor of ordinary construction driven by a belt from the driving-shaft 3.

The regulating-valve used in this governor is a modification and adaptation of the regulating-valve used in my constant-efficiency governor, which forms the subject-matter of a separate application for Letters Patent filed March 13, 1896, Serial No. 583,123. The nozzle 7 is provided with a boss 8, containing the parts of the valve. Within this boss is a valve-chamber 9, within which slides a valve 10, by which the size of the stream of water issuing from the nozzle is regulated.

For convenience in construction the boss 8 may be bored cylindrically through its whole length to form the valve-chamber, and the front portion of the valve-chamber thus formed may be closed by a cylindrical plug or cap 11, having within it a central slot or passage 12, through which the jet passes and in which the valve 10 slides.

The valve 10 has a front and rectangular-shaped portion 13, which slides in the slot 12 of the cap 11, and a rear piston-shaped portion 14, which fits closely within the valve-chamber 9. This piston 14 divides the valve-chamber 9 into a front chamber 15, the front of which is closed by the cap 11, and a rear chamber 16, which is closed at the end by a screw-cap 17, screwing over the end of the boss 8.

In one side of the valve 10 is a groove or water-passage 18, (shown in Figs. 7, 9, and 10,) through which water from the portion 19 of the bore of the nozzle, which is in rear of the valve 10, may pass into the chamber 16 in rear of the piston 14. The front corners of the rectangular portion 13 of the valve are rounded, so as to form, with the cap 11, grooves 20 20. The groove 18 is in the center of the rear side of the portion 13 of the valve, and therefore water passing through this groove does not pass into the chamber 15, water passing into and out of the chamber 15 through the grooves 20.

In the screw-cap 17 is a waste-passage 21, through which water may escape from the chamber 16. The passage of water through this water-passage is regulated by an auxiliary slide-valve 22, sliding in a horizontal valve-chamber in the screw-cap 17 and having a port 23, arranged to communicate with the passage 21. When the port 23 is open, water may pass through the passage 21, and when the valve 22 is so moved that the port 23 is closed water cannot pass through the passage 21. Upon the rod 22 are abutments 24 24, which limit the movement in each direction of the valve 22.

The valve 22 is secured to or formed integrally with a cylindrical rod 22', which extends through the side of the case 1 and through a bushing 25, journaled in a bearing 26 of the case 1, and carries the band-wheel 27, by which the governor-balls are rotated. The rod 22' may conveniently rotate with the sleeve 25, as it does in the construction shown in Fig. 4, and to this sleeve and to the rod 22' are secured springs 28 28 and 29 29, to which the governor-balls are secured, the arrangement of the springs being such that as the band-wheel 27 is rotated the balls 30 also rotate, and being forced outward by centrifugal action as the speed of revolution increases, pull the rod 22' outward through the bushing 25, thus changing the position of the valve-port 23 with respect to the waste-passage 21 of the valve-chamber 9.

I do not limit myself to this or any other particular form of fly-ball governor, nor do I deem it necessary to illustrate in detail the construction of the particular fly-ball governor shown, as this is merely one form of governor which has been largely used. I may use any of the ordinary forms of fly-ball governors, all of which operate to move backward or forward on an axial rod as the speed of rotation increases or decreases.

The operation of my governor is as follows: Normally in any position of the valve 10 the water-pressure in the chamber 16 upon the rear side of the valve-piston 14, due to water which has entered the chamber 16 through the groove 18, is balanced by the water-pressure upon the front side of the valve-piston 14, due to water which has entered the chamber 15 through the grooves 20 20, and the pressure upon the front of the rectangular portion 13 of the valve. The pressure in the rear portion 19 of the bore of the nozzle, from which water is supplied to the chamber 16, is of course greater than the water-pressure upon the face of the valve 10 in the most contracted portion of the nozzle, since in the larger portion 19 of the bore of the nozzle the velocity of the water is low and its energy is potential, while in the contracted portion of the nozzle the velocity of the water is high and its energy is kinetic, so that were the waste-passage 21 closed the pressure below the valve 10 would be greater than the pressure above it, and the valve would be lifted; but when the wheel is in operation at the proper speed the rotation of the governor-balls keeps the rod 22' in the proper position to open the port 23 partly, thus permitting sufficient water to escape from the chamber 16 to keep the pressure upon both sides of the valve the same and so to hold the valve stationary. If the speed of the wheel falls below that for which the governor-balls are adjusted, these balls move closer to their shaft, and the rod 22' is pushed inward, thus increasing the opening of the port 23 and causing more water to flow through the waste-passage 21, thereby lowering the pressure in the chamber 16 and causing the valve 10 to fall, thus increasing the size of the jet. As the size of the jet is increased the speed of the wheel increases and the governor-balls move away from their shaft, gradually closing the port 23 and restricting the flow of water through the waste-passage 21 until, when the water-wheel has reached the desired speed for which the governor is set, the water-pressure upon both faces of the valve 10 is balanced and the valve is stationary. If, on the other hand, the speed of the water-wheel rises above that for which the governor is adjusted, the governor-balls moving outward decrease still further the opening of the port 23 or close the port 23 altogether, thus restricting or stopping the flow of water through the waste-passage 21. This causes the pressure in the chamber 16 to rise, thus moving the valve 10 upward and decreasing the size of the jet flowing therefrom. As the size of the jet decreases, the speed of the wheel falls and the governor-balls, moving closer to their shaft, gradually open the port 23, thus permitting more water to flow through the waste-passage 21 until, when the water-wheel has reached the speed for which the governor is adjusted, the water-pressure upon both sides of the valve 10 is balanced and the valve is stationary.

The governor may be adjusted to hold the water-wheel at any desired speed by properly proportioning the weight of the governor-balls or the tension on their springs or in other well-known manners. There are numerous fly-ball governors now in use which are capable of easy adjustment to any desired speed, and therefore I do not consider it necessary to specifically show or describe any such means of adjustment.

It will be seen that the fly-balls 30 are required only to move an auxiliary valve which by its opening or closing controls the movement of the main regulating valve or gate by which the flow of water through the nozzle is controlled. This is desirable both in order that the work required of the governor may be very slight, so that it may be very sensitive in action, and also that the rate of opening and closing of the regulating-valve may be readily controlled and adjusted independently of the adjustment of the fly-balls and parts connected therewith. This is accomplished in the valve shown in the drawings by varying the size of the various water-passages of the regulating-valve. If the valve be found to open too slowly, this will in general be due to the fact that the waste-passage 21 is too small, so that it does not permit a sufficiently rapid flow of water from the chamber 16 when the auxiliary valve 22 opens, which may be remedied by increasing the size of this opening. It may also be due to the fact that water does not flow sufficiently rapidly into the chamber 15 as the piston 14 moves down, which may be remedied without sensibly affecting the rate of closing by filing the rear edges 31 of the valve, so as to form grooves similar to the grooves 20, through which water may flow into the chamber 15. If the valve opens too fast, this may be remedied by reducing the size of the waste-passage 21, so that water may flow more slowly from the chamber 16, or by increasing the size of the groove 18, through which water flows into the chamber 16. It may also be remedied by substituting another valve 10, the corners of which are not cut away to so great an extent as the former valve, thus decreasing the rapidity of the flow of water into the chamber 16.

If the valve closes too slowly, this may be remedied by enlarging the groove 18, thus increasing the rapidity of flow of water into the chamber 16, and by filing the front corners of the valve away, so as to increase the size of the groove 20, and so affording freer passage of water from the chamber 15. The size of the grooves at the back corners 31, if these corners have been cut away to form water-passages, may be reduced, thus decreasing the rate at which water flows into the chamber 15. If the valve closes too rapidly, this may be remedied by reducing the size of the groove 18, by reducing the size of the grooves 20, and by forming or enlarging the grooves at the back corners 31 31 of the valve.

The effect of providing water-chambers 15 and 16 on the valve or balance chamber 9 both above and below the valve-piston 14 is, as will be seen, to place the valve in effect in a dash-pot. The valve can open only as water flows out of the chamber 16 and into the chamber 15 and can close only as water flows out of the chamber 15 and accumulates in the chamber 16. By regulating the rate of flow of water into these chambers the rate of opening and closing of the regulating-valve may be regulated as desired, and in this way too rapid or too slow opening or closing of the valve by the fly-balls, which might lead to overgoverning, is prevented.

Having thus completely described my invention, what I claim, and desire to secure by Letters Patent, is—

1. In a regulator for water-wheels, the combination, with a supply-passage for the water-wheel, and a valve arranged to restrict the flow of water through said passage by moving across the same, and having upon its face the water-pressure therein, of a balancing-piston connected with said valve and working within a closed balancing-chamber, means for admitting water under pressure into said chamber upon one side of said piston, for the purpose of balancing the pressure upon the face of the valve, a waste-passage through which water may escape, an auxiliary valve controlling the flow of water through said waste-passage, means operated by variation in the speed of the wheel for operating said auxiliary valve, thereby varying the pressure in said chamber upon the piston, and a restricted passage, connected with said chamber upon the other side of said piston and with a source of water-supply, through which water may pass into and out of said chamber, substantially as described.

2. In a regulator for water-wheels, the combination, with the supply-passage of the water-wheel, and a valve arranged to restrict the flow of water through said passage having upon its face the water-pressure therein, and provided upon its rear side with a piston, of a closed chamber within which said piston works, means for admitting water under pressure into said chamber in rear of said piston, a waste-passage through which such water may escape, an auxiliary valve controlling the flow of water through said waste-passage, means operated by variations in the speed of the wheel for operating said auxiliary valve thereby varying the pressure in said chamber in rear of said piston, and a restricted passage communicating with said chamber in front of said piston, through which water may pass into and out of said chamber, substantially as described.

3. In a regulator for water-wheels, the combination, with the supply-passage of the water-wheel, and a valve arranged to restrict the flow of water therethrough having upon its front face the water-pressure in the restricted portion of said passage, and provided upon its rear side with a piston, of a closed chamber in which said piston works, a water-passage connecting the supply-passage in rear of its restricted portion with the chamber in rear of said piston, a waste-passage through which such water may escape, an auxiliary valve controlling the flow of water through said waste-passage, means operated by variations in the speed of the wheel for operating said auxiliary valve, thereby varying the pressure in said chamber in rear of said piston, and a restricted passage connecting the front portion of said supply-passage with said chamber in front of said piston, through which water may pass into and out of said chamber, substantially as described.

4. In a water-wheel, the combination, with a series of buckets revolubly mounted, a nozzle arranged to project a jet of water into said buckets successively, a valve-chamber in communication with the bore of the nozzle and a valve in said chamber adapted to move across the bore of the nozzle and so to restrict the flow of water therethrough, said valve and valve-chamber being enlarged at the rear end to form a piston and a chamber in which said piston may work, of a water-passage in said valve connecting the valve-chamber in rear of said piston with the bore of the nozzle in rear of the restricted portion thereof, a waste-passage through which such water may escape from said chamber, an auxiliary valve controlling the flow of water through said passage, means, operated by variations in the speed of the wheel, for operating said auxiliary valve, and other water-passages connecting the front portion of the bore of the nozzle with the valve-chamber in front of said piston, through which water may pass into and out of said chamber, substantially as described.

5. In a water-wheel, the combination, with a series of buckets revolubly mounted, a nozzle arranged to project a jet of water into said buckets successively, a valve-chamber in communication with the bore of the nozzle and having a greater diameter than the width of said passage, a plug in the front end of said chamber having a passage with a valve therein arranged to move transversely to the bore of the nozzle and thereby to restrict the flow of water therethrough, a piston upon the rear end of said valve fitting closely to the sides of the valve-chamber, a water-passage connecting the bore of the nozzle in rear of the restricted portion thereof with the valve-chamber in rear of said piston, a waste-passage communicating with said valve-chamber in rear of said piston, an auxiliary valve controlling the flow of water through said waste-passage, means, operated by variations in the speed of the wheel, for operating said auxiliary valve, and water-passages connecting the front of the bore of the nozzle with the valve-chamber in front of said piston, substantially as described.

In testimony whereof I affix my signature in presence of two witnesses.

HARVEY D. WILLIAMS.

Witnesses:
W. STRUNK, Jr.,
O. F. EMERSON.